United States Patent
Robinson et al.

(10) Patent No.: US 10,684,807 B2
(45) Date of Patent: Jun. 16, 2020

(54) CLIENT BASED SPLITTING OF PDF/VT DPART CATALOG

(71) Applicant: Xerox Corporation, Norwalk, CT (US)

(72) Inventors: David C. Robinson, Penfield, NY (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 557 days.

(21) Appl. No.: 13/892,693

(22) Filed: May 13, 2013

(65) Prior Publication Data

US 2014/0333947 A1 Nov. 13, 2014

(51) Int. Cl.
*G06F 3/12* (2006.01)
*G06F 40/114* (2020.01)

(52) U.S. Cl.
CPC .......... *G06F 3/1211* (2013.01); *G06F 3/1247* (2013.01); *G06F 3/1248* (2013.01); *G06F 3/1285* (2013.01); *G06F 40/114* (2020.01)

(58) Field of Classification Search
USPC ................................ 358/1.15, 1.18; 382/304
See application file for complete search history.

(56) References Cited

U.S. PATENT DOCUMENTS

| | | | |
|---|---|---|---|
| 2008/0309962 A1* | 12/2008 | Smith | 358/1.15 |
| 2011/0122433 A1* | 5/2011 | Klassen | 358/1.15 |
| 2011/0170132 A1* | 7/2011 | Mori | 358/1.15 |
| 2012/0147426 A1* | 6/2012 | Naka | G06F 3/1206 358/1.18 |
| 2012/0186475 A1* | 7/2012 | Boeck | G03G 15/231 101/490 |

\* cited by examiner

*Primary Examiner* — Huo Long Chen
(74) *Attorney, Agent, or Firm* — Fay Sharpe LLP (57) ABSTRACT

A method for outputting a print job includes accessing a file representing a previously created document at a client computer. The method includes accessing a catalog tree residing in the document and including metadata corresponding with a job ticket embedded in the file for rendering the document. The method includes splitting pages in the document into multiple chunks using a splitter located in the client computer. The method includes splitting by the splitter the catalog tree into a set of branches each corresponding with one of the chunks of the finished document. The method includes embedding corresponding branch information into the each chunk. The method includes generating a package of chunks. The method includes streaming the package to a digital front end (DFE) of an output device.

12 Claims, 8 Drawing Sheets

MIME PACKAGE FOR PDF/VT-2S

CONTENT-TYPE: MULTI-PART MIXED
%!X-PDFVT-STREAM-VERSION 1
%!XEROX PRESPLIT

ICC PROFILE 1
CONTENT-TYPE: APPLICATION/VND.ICCPROFILE
ENCODING:BINARY
FILENAME: XX
PROFILE CONTENT

PDF CHUNK 1
CONTENT-TYPE: APPLICATION/PDF
ENCODING:BINARY
DISPOSITION: ATTACHMENT
FILENAME: GG
PDF/VT-2 CONTENT (USES PROFILE XX)
    DPartRoot
        NodeNameList
            0: ROOT
                1:RECIPIENT
        RecordLevel:1

ICC PROFILE 2
CONTENT-TYPE: APPLICATION/VND.ICCPROFILE
ENCODING:BINARY
FILENAME: YY
PROFILE CONTENT

PDF CHUNK 2
CONTENT-TYPE: APPLICATION/PDF
ENCODING:BINARY
DISPOSITION: INLINE
PDF/VT-2 CONTENT (USES PROFILE XX)
    DPartRoot
        NodeNameList
            0: ROOT
                1:RECIPIENT
        RecordLevel:1

PDF CHUNK 3
CONTENT-TYPE: APPLICATION/PDF
ENCODING:BINARY
DISPOSITION: INLINE
PDF/VT-2 CONTENT (USES PROFILE YY)
    DPartRoot
        NodeNameList
            0: ROOT
                1:RECIPIENT
        RecordLevel:1

CLIENT BASED SPLITTING OF PDF/VT DPART CATALOG

BACKGROUND

The present disclosure relates to a splitter operation performed on a PDF/VT file at the client device for rendering output at a printer device. More specifically, the splitter operation divides a catalog tree into multiple branches. The printer device uses relevant tree portions when processing corresponding chunks.

Portable Document Format ("PDF") is a commonly used standard for representing a finished document as fixed content after the document is formatted. A relatively newer standard is a PDF/VT file, which is a type of PDF file for exchange of variable data and transactional (VT) printing. Generally, the fixed content portion of the PDF functions as a template, which is adapted for use in multiple renderings. Each rendering process undergoes a merge with variable data for providing printout or display output with variable content.

In a conventional approach, the PDF/VT file is processed at a printer device for rendering output and receiving finishing operations. Mainly, the PDF/VT file is divided into multiple chunks using a splitter included in the printer device. Each split chunk is a self-contained, PDL file which is part of a larger set of chunks defining the complete job. The chunks are oftentimes split in interleave fashion to improve processing time.

Figure 1:
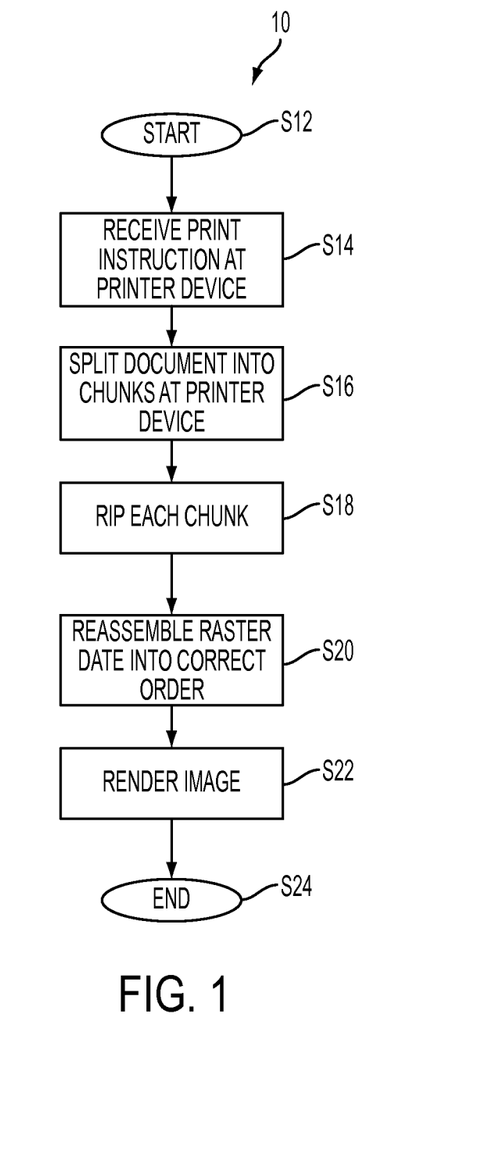
FIG. 1 shows a conventional splitter operation according to the PRIOR ART.

FIG. 1 shows a conventional splitter operation 10 according to the prior art. The method starts at S12. A printer device receives a print instruction for rendering a document at S14. A splitter, included in the printer device, splits the document pages into multiple chunks at S16. A raster image is generated for each chunk using at least one raster image processor ("RIP") at S18. The raster data is collected and reassembled into correct order at S20. The image rendering components in the printer device use the raster data to render the document at S22. The method ends at S24.

While the RIP interprets the text and graphics information described in the PDF, set based operations are provided in a Dpart catalog. The PDF/VT file can include a catalog tree, known as the Dpart catalog, which contains metadata that can be used for the variable rendering of the contents defined within the PDF pages. An accompanying JDF includes directions for how the metadata is to be used by the RIP, the print system, and the finishing systems. In other words, the Dpart catalog includes instructions and boundary information for applying, for example, finishing operations to select areas in the rendered document. The catalog tree is distributed among the appropriate root, set, and document and sub-document level. The commands in the catalog tree are analyzed and applied to the corresponding pages and/or images in the RIPped job. In one illustrative example, the metadata can include recipient data, such as, a ZIP code, which the JDF specifies to be printed on different grades of media stock.

One problem with the conventional approach is that boundary information, which is needed to apply the set based operations, can be lost when the PDF/VT file is split in interleave fashion. Generally, the printer device malfunctions and ceases the print operation when the boundary information in the catalog tree does not match, or cannot be performed on, the corresponding page in the raster data.

One potential solution would be to include a full copy of the catalog into each split chunk. However, a long job, with a large memory footprint, can result in processing delays.

There is desired an improved splitting operation that reduces delays in the print operation. A system and method are desired which include a client-based splitter to take processing burden away from the DFE-based splitter, thus improving performance time for the RIPing/imaging processes of the PDF/VT job and the image output terminal ("IOT"), i.e., the printer's, rated speed.

BRIEF DESCRIPTION

The present disclosure relates to a client-based splitting operation that splits a PDF/VT file in interleave fashion and packages the split content with set boundary information and page numbering metadata for the DFE to handle.

One embodiment of the present disclosure relates to a method for outputting a print job. The method includes accessing a file representing a previously created document at a client computer. The method includes accessing a catalog tree residing in the document and including metadata corresponding with a job ticket embedded in the file for rendering the document. The method includes splitting pages in the document into multiple chunks using a splitter located in the client computer. The method includes splitting by the splitter the catalog tree into a set of branches each corresponding with one of the chunks of the finished document. The method includes embedding corresponding branch information into the each chunk. The method includes streaming the chunks as a package to a digital front end (DFE) of an output device.

Another embodiment of the present disclosure relates to a system for outputting a print job. The system includes a client computer. The client computer includes a splitter adapted to split into multiple chunks pages in a finished document after being formatted. The splitter is further adapted to trim into a set of branches a catalog tree residing in the finished document and including metadata corresponding with a job ticket embedded in the file. Each branch includes the metadata required for corresponding pages in a chunk. The client computer further includes a processor adapted to generate a package of the chunks. The processor is further adapted to embed corresponding branch information into the each chunk and stream the package to a digital front end (DFE).

Another embodiment of the present disclosure relates to a system for outputting a print job. The system includes a client computer and an output device. The client computer includes a splitter that is adapted to split into multiple chunks pages in a finished document after being formatted. The splitter trims a catalog tree residing in the finished document into a set of branches. The client computer further includes a first processor that is adapted to stream the chunks as a package to a digital front end. The output device includes a pre-processor that is adapted to deactivate a splitter located in the output device in response to receiving the package. The output device further includes a chunk handling module that is adapted to assign the chunks between a series of raster image processors (RIPs). The output device further includes a file generation module that is adapted to generate reassembly commands for each chunk describing pages in the each chunk. The output device further includes a collector module adapted to reassemble the pages of the document in correct order. The output device further includes a processor that is adapted to execute the modules.

DETAILED DESCRIPTION

The present disclosure relates to a splitting and streaming operation performed on a PDF/VT file and a corresponding DPart catalog at a client device for further RIPping and processing at a printer device. In the exemplary embodiment of the present disclosure, the PDF/VT file is pre-processed using a splitter included in the client device to reduce delays in the print operation that are otherwise caused by a conventional splitting operation at the printer device.

Figure 2:
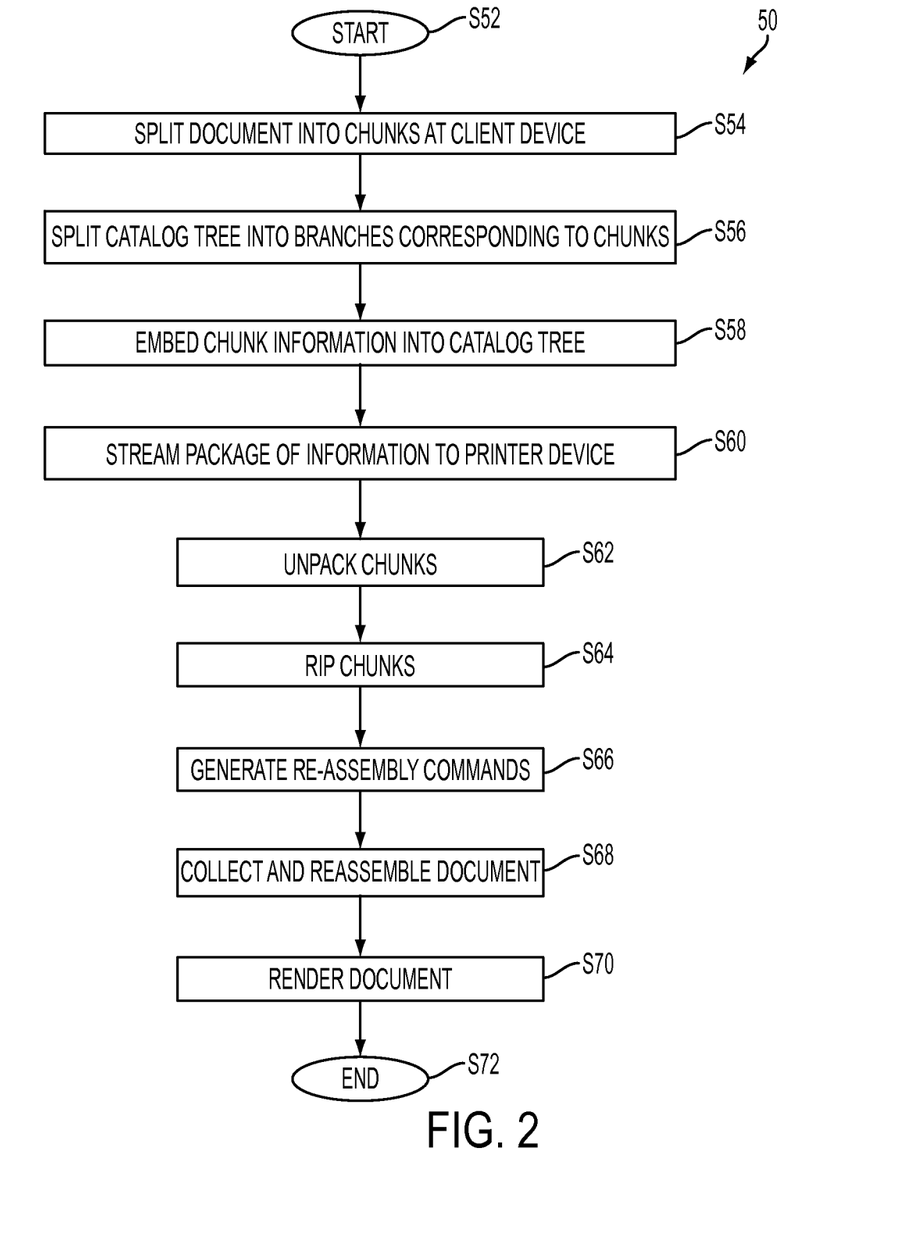
FIG. 2 is a general overview of a method for processing a print job according to the present embodiment.

FIG. 2 is a general overview of a method 50 for processing a print job according to the present embodiment. The method starts at S52. In response to a print instruction, a splitter, included in a client device, splits the document pages into multiple chunks in interleave fashion at S54. The client-based splitter further splits the catalog tree into a number of branches according to the pages to be RIPped in each chunk at S56. The client device adds metadata information, i.e., set-boundary indicators and the page numbers, to the catalog tree and embeds the metadata into the chunks at S58. The set-boundary indicators indicate a boundary for each set of pages that are grouped together for a finishing operation. A set-boundary indicator can include the beginning page of a partitioned set and/or document (hereinafter referred to as "begin-set indicator"). The set boundary indicator can additionally include a last page of the partitioned set ("end-set indicator"). For example, the system can embed the begin-set indicator information into a select page for indicating that the page is the first page in a set. The client device packages the information and streams the file to the printer device at S60. The printer device reads the file and unpacks the chunks at S62. The printer device feeds the chunks to at least one RIP at S64. The begin-set indicator and page number information is obtained from a dictionary list that is provided for all the RIPped pages at S66. This information is added to the End of Finishing control data that is processed for each RIPped chunk. The information is used by the post-RIP job re-assembly code to put in the proper commands for reassembling the job. This information is used to retrieve, collect, and reassemble the RIPped pages that were generated from the chunks. At S68. The image rendering components in the printer device use the raster data to render the document at S70. The method ends at S72.

Figure 3:
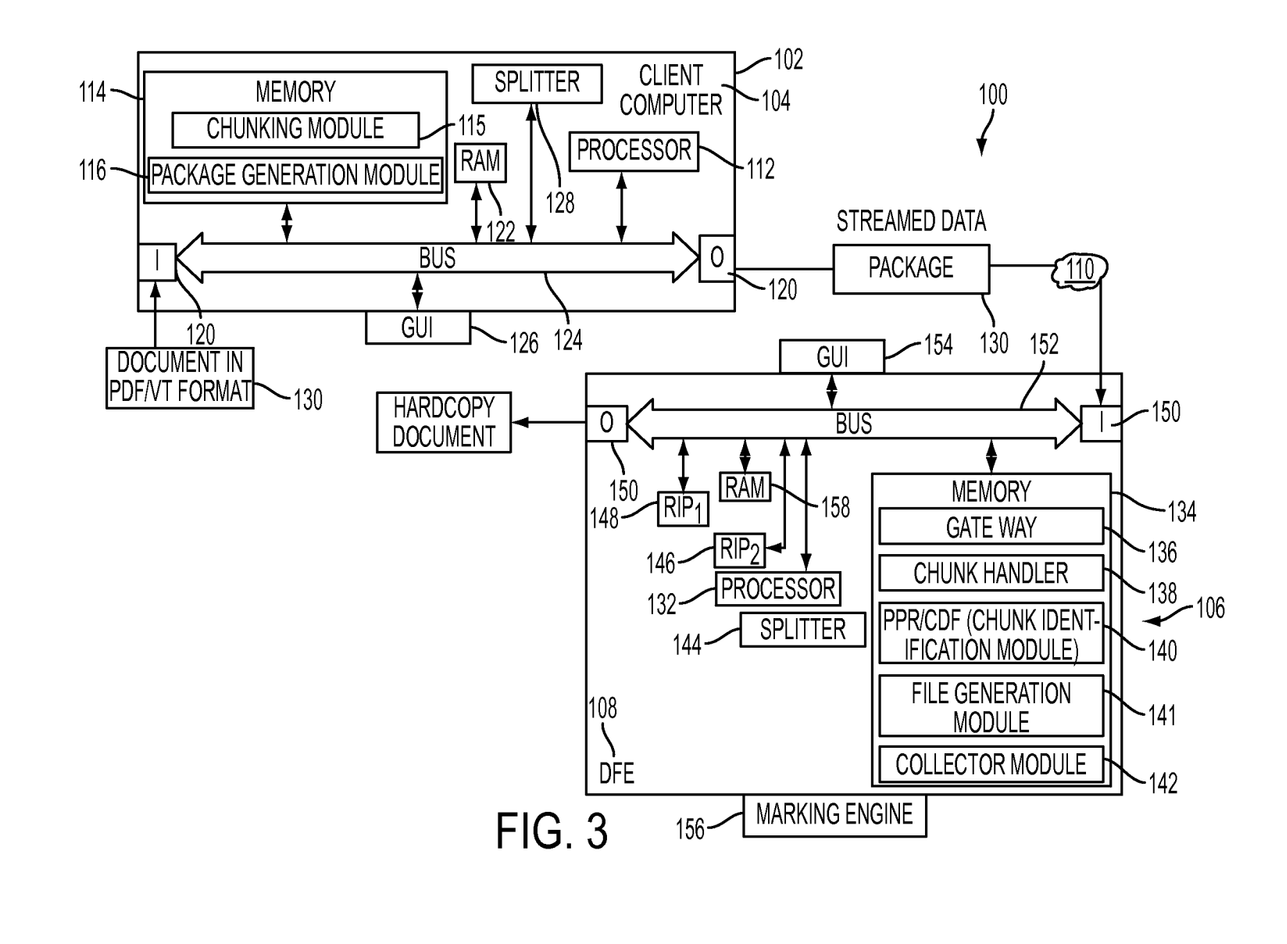
FIG. 3 is a schematic illustration of a system in one aspect of the exemplary embodiment.

FIG. 3 is a functional block diagram of a print processing system 100 in one exemplary embodiment. The system 100 may include a splitting (i.e., pre-processing) system 102, hosted by a computing device 104, such as a client computer and/or device, and a processing system 106, hosted by a digital front end ("DFE"), such as the illustrated printer and/or output device 108, which are linked together by communication links 110, referred to herein as a network. These components are described in greater detail below.

The client device 104 illustrated in FIG. 3 includes a processor 112, which controls the overall operation of the routing system 102 by execution of processing instructions, which are stored in memory 114 connected to the processor 112.

The splitting and/or pre-processing operation disclosed herein is performed by the processor 112 according to the instructions stored in the memory 114. In particular, the memory 114 stores a chunking module 115, which determines the appropriate pages for including in a chunk, and a package generation module 116, which is adapted to generate files with branch information embedded into chunks that are packaged and streamed to the DFE 108.

The client device 104 also includes one or more communication interfaces (I/O), such as network interfaces 120 for communicating with external devices, such as output device 108. The various hardware components 112, 114, (random access memory "RAM") 122 of the client device 104 may all be connected by a bus 124.

With continued reference to FIG. 3, the client device is communicatively linked to a user interface device (GUI) 126 via a wired and/or wireless link. In various embodiments, the user interface device 126 may include one or more of a display device, for displaying information to users, and a user input device, such as a keyboard or touch or writable screen, for inputting instructions and/or receiving status information, and/or a cursor control device, such as a mouse, trackball, or the like, for communicating user input information and command selections to the processor 112. Specifically, the user interface device 126 includes at least one of an input device and an output device, both of which include hardware, and which are communicatively linked with the client device 104 via wired and/or wireless link(s).

With continued reference to FIG. 3, the pre-processing system 102 includes a splitter 128 that is part of or in communication with the client device 104. The splitter 128 is adapted to split a PDF/VT document into multiple chunks and split a catalog tree into branches. Each branch corresponds with a chunk. The chunks, including embedded branch information, are streamed to the DFE 108 as a package 130.

As mentioned, the client device 104 of the system 100 is communicatively linked with the DFE 108 via link 110. The DFE 108 includes a processor 132 and memory 134, and/or has access to a storage device such as storage device, for storing software modules executable by the processor 132. Memory 134 stores software instructions for implementing the processing operation of the exemplary method shown in FIG. 7. In particular, the instructions include a gateway 136, a chunk handling module ("chunk handler") 138, a chunk identification module 140, a file generation module 141 and a collector module 142.

The illustrated gateway receives the streamed package 130 and deactivates a splitter 144 in the DFE 108.

The chunk handler 138 unpackages the chunks. The chunk identification module 140 identifies each chunk and assigns the chunk to at least one raster image processor 146, 148.

In the illustrated embodiment, the page numbering information can be sequenced within chunks at the client device. However, in contemplated embodiments, a file generation module 141 can generates a page numbering file indicating the page numbers in each chunk.

After the pages are RIPped, the collector module 142 uses the page numbering file to reassemble the RIPped pages into correct order.

These modules 136-142 will be later described with reference to the exemplary method. The DFE 108 further includes a communication interface (I/O) 150 including hardware and/or software suitable for providing wired or wireless data communication with the pre-processing system 102. The memory 132, processor 134, and communication interface 150 are communicatively linked by a bus 152.

While the DFE may include an electronic display, for example as part of a graphic user interface 154, the exemplary embodiment includes an image rendering device that may include a marking engine 156, which applies marking medium, such as ink or toner, to a substrate, such as paper, using, for example, a laser, inkjet, thermal, or other transfer process. The printer renders images on print media, such as paper, and can be a copier, laser printer, bookmaking machine, facsimile machine, or a multifunction machine (which includes one or more functions such as scanning, printing, archiving, emailing, and faxing.

The memory 114, 122, 134, 158 may represent any type of tangible computer readable medium such as random access memory (RAM), read only memory (ROM), magnetic disk or tape, optical disk, flash memory, or holographic memory. In one embodiment, the memory 114, 122, 134, 158 may each comprise a combination of random access memory and read only memory. The digital processors 112, 132 can each be variously embodied, such as by a single-core processor, a dual-core processor (or more generally by a multiple-core processor), a digital processor and cooperating math coprocessor, a digital controller, or the like. The digital processors 112, 132 in addition to controlling the operation of the respective pre-processing system 102 or processing system 106, executes instructions stored in 114, 122, 134, 158 for performing the parts of the method outlined below.

The software modules as used herein, are intended to encompass any collection or set of instructions executable by the pre-processing system 102 and processing system 106 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 120, 150 may include, for example, a modem, a router, a cable, and and/or Ethernet port, etc.

As will be appreciated, while two computing devices 104, 108 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 4:
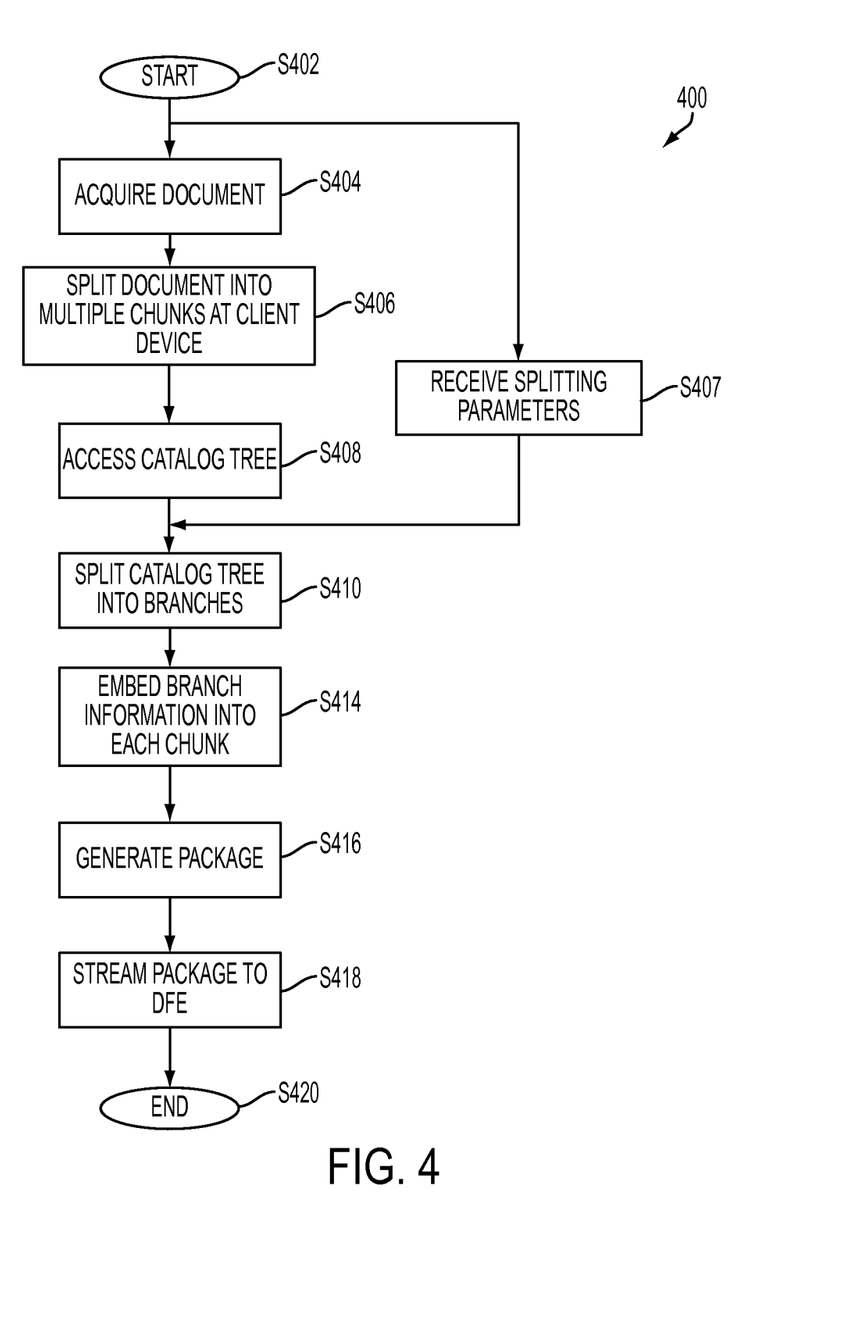
FIG. 4 is a flow chart illustrating an exemplary method for a splitting and streaming operation performed at a client device according to the exemplary embodiment.

Now referring to FIG. 4, a flow chart is shown for illustrating an exemplary method 400 for a splitting and streaming operation performed at a client device according to the exemplary embodiment. The method starts at S402. A document is acquired at S404. In the exemplary embodiment, the document is a PDF/VT document, although no limitation is made herein to a format of the received document.

In one embodiment, the graphic user interface on the client device displays an option for selectively using the splitting and/or streaming application that is disclosed herein. The splitting and/or streaming operation can initiate in response to a user-input for selecting the application.

Generally, the application initiates a client-based splitter (e.g., a PDF splitter) operation. The application has knowledge of the capability and/or functionality of at least the printer-based splitter (i.e., the free-flow print server ("FFPS")-based splitter) contained in the printer that is in communication with the client device. The client-based splitter is adapted to split the document pages into multiple chunks using similar processing so that the printer device can later RIP the chunks at S406.

In one embodiment, the client-based splitter can perform the splitting according to predetermined parameters received at the client device at S407. For example, each chunk can be predefined as including a select and/or a maximum number of pages. In another example, each chunk can be predefined to use a select or maximum amount of memory. The client device can offer various chunk size configuration options on the GUI and receive a selection by user input. In yet another contemplated embodiment, the client device can query the DFE using, for example, Internet Print Protocol (IPP), Job Messaging Format (JMF), File Transfer Protocol (JMF), or another protocol. Any conventional protocol can be used to query the targeted recipient DFE for determining which splitting parameters to apply. For example, the recipient DFE may be capable of RIPping a maximum number of pages and/or bytes per chunk. In other words, the predetermined chunk size can be determined by querying the printer device and/or by receiving user inputs.

In the discussed embodiment, the chunks are generated in interleave fashion. Because the chunks are relatively equal as a result of the predetermined chunk size parameter, the chunks undergo later (RIPping) processing at approximately the same rate.

Furthermore, the client-based splitter includes additional functionality. The new functionality occurs when the client-based splitter encounters a catalog tree. Mainly, the client device accesses the catalog tree at S408, which resides in the PDF document. The catalog tree has a piece of metadata that is attached to each page. The accompanying job ticket (JDF) instructs the printer device on how to apply the metadata. Accordingly, the DPart catalog can become a sizeable tree structure that associates conditions with all the pages in the print job.

Figure 5A:
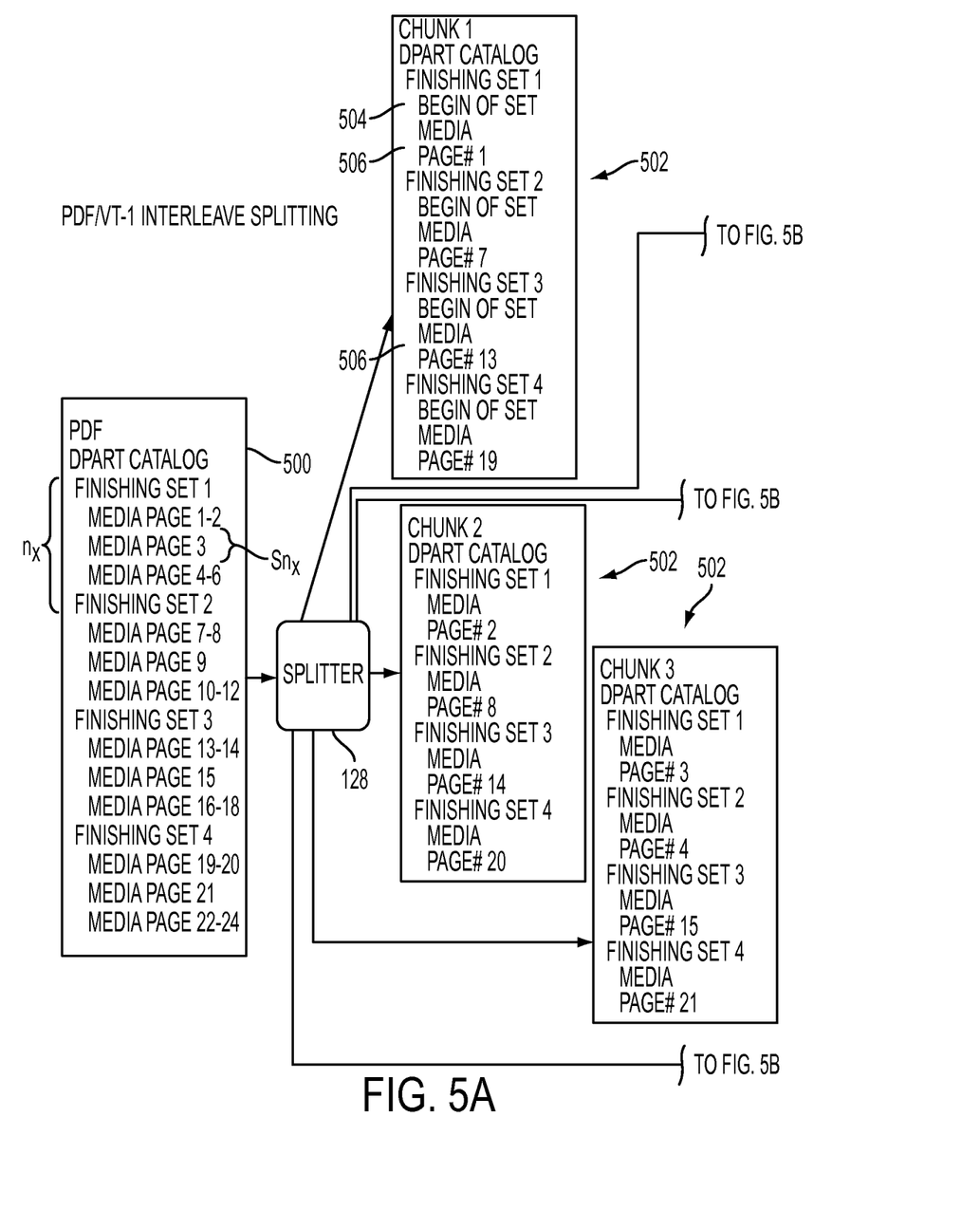
FIGS. 5A and 5B show a sample branches generated from a catalog tree during an interleave splitting operation in FIG. 4.
Figure 5B:
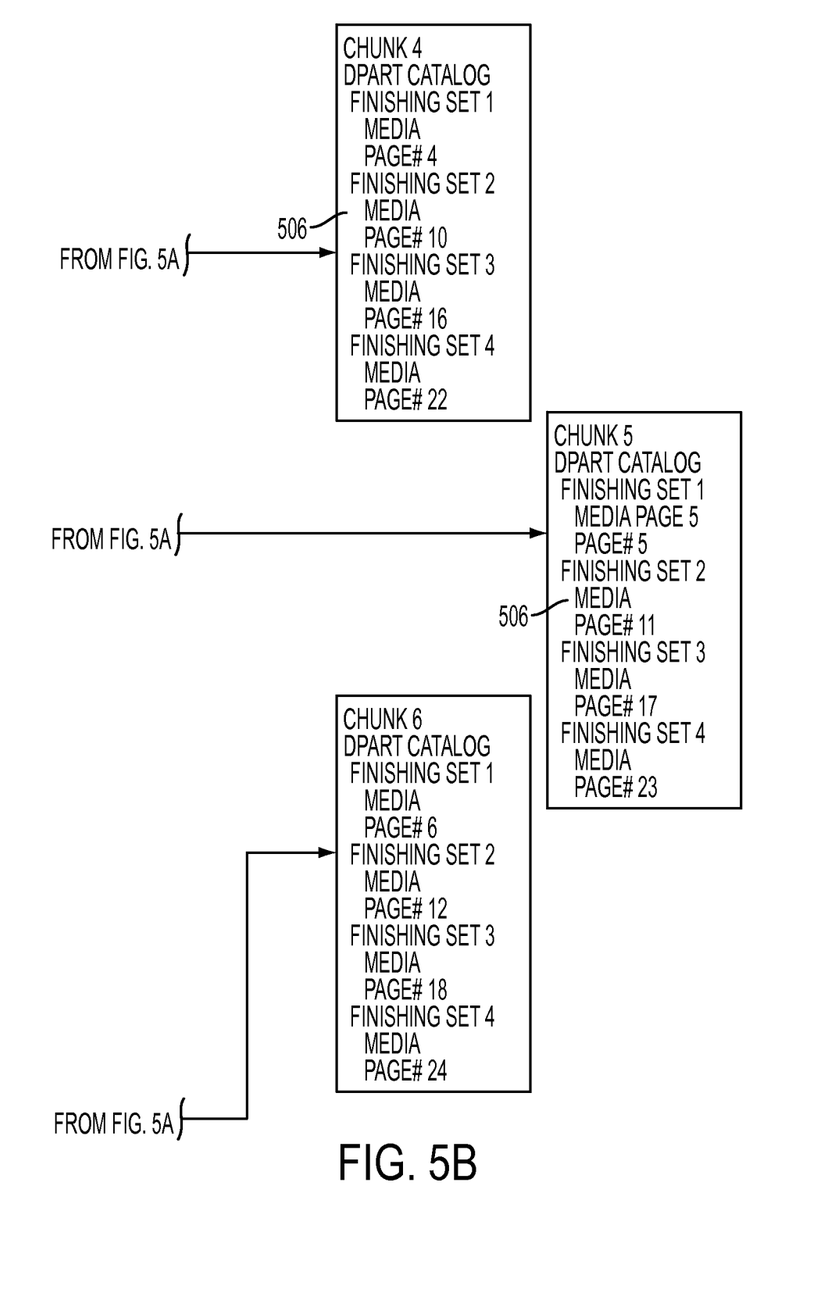

The DPart catalog is trimmed until only the Dpart information remains that is required for the resident pages within the chunk. FIGS. 5A and 5B show a trimmed DPart catalog. The DPart catalog 500 (FIG. 5A) provides the set-based operations for the contents defined within the PDF pages. The Dpart catalog 500 includes a series of nodes $n_x$, each of which define a finishing level. The illustrated catalog 500 includes four finishing sets. The DPart catalog 500 also includes a series of sub-nodes $sn_x$, which each define a media level.

The client-based splitter 128 splits the catalog tree 500 into a number of branches 502 (FIG. 5A) that each corresponds with a respective chunk at S410. Mainly, "begin-set indicator" information 504 (FIG. 5A) is added at the set boundaries of the catalog tree. As mentioned, this information identifies the first page in the chunk. In illustrative embodiments, the begin-set indicator information 504 can be added at one of the set node and the subset node. FIGS. 5A and 5B show this information added to sample branches 502 for chunks that were generated from a PDF/VT document during the interleave-type splitting operation described for S406 in FIG. 4. The illustrative example shows the branches 502 from the DPart catalog for six chunks. The begin-set indicator information is added at the node in the branch corresponding to the first chunk.

The appropriate pages for each chunk are determined by a chunking module, which performs the same functionality of a conventional printer-based chunking mechanism. Page number metadata 506 for each page is added to the branch. The branch information is embedded into each chunk at S414. In another embodiment, the begin-set indicator and/or page number information can be embedded into the respective chunks. In another contemplated embodiment, however, the page numbering information can be contained in a file within a MIME package that includes the chunks.

Continuing with FIG. 4, the chunks are then packaged in the order that they were produced at S416 by a packaged generation module. In the illustrated embodiment, the chunks are packaged in a PDF/VT compliant MIME package. In a contemplated embodiment, the package can be tagged to indicate that it was generated from the pre-processing, splitting operation performed at the client device.

Figure 6:
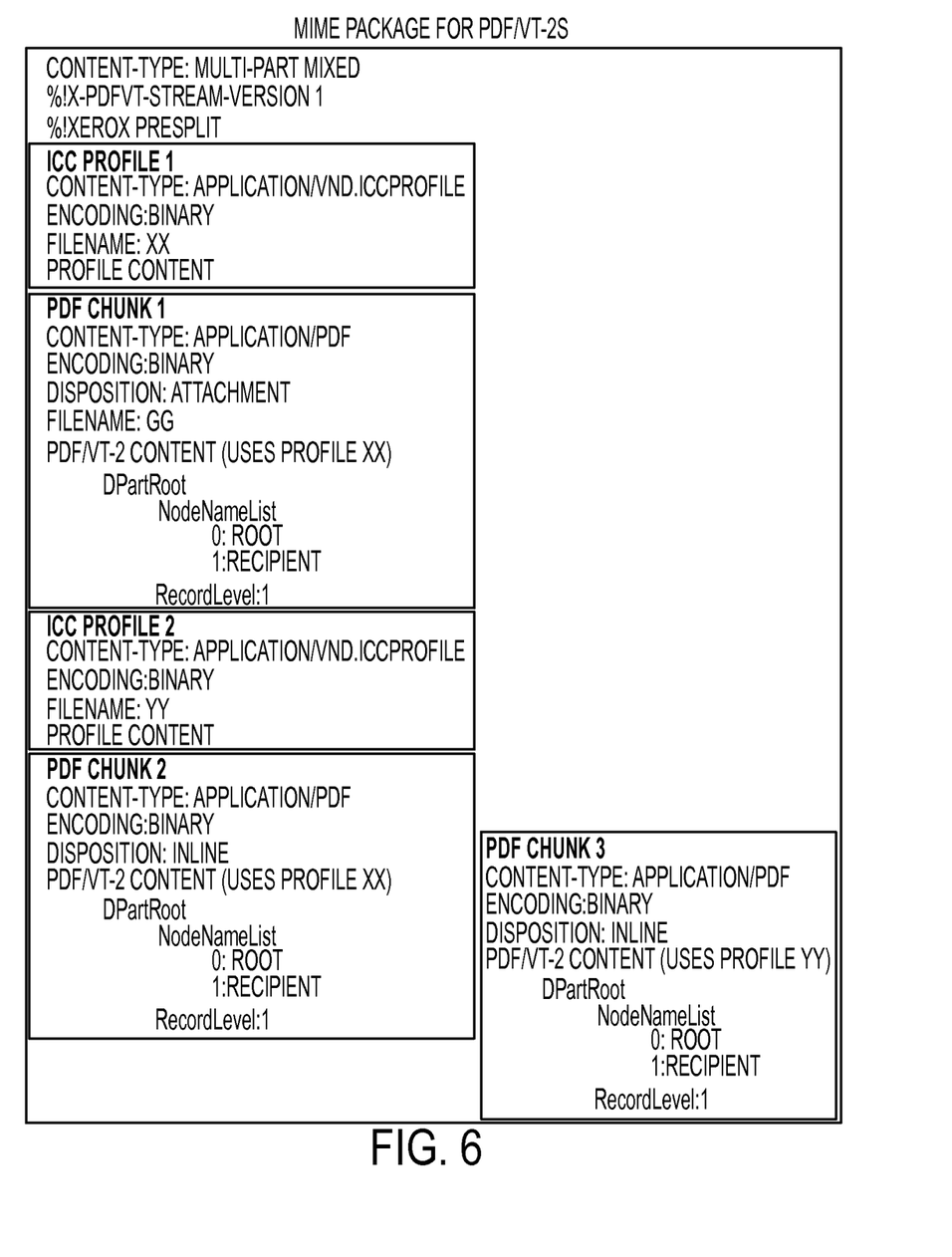
FIG. 6 shows a sample MIME package generated during the splitting process in FIG. 4.

The MIME package is a sequence of the PDF/VT chunks that are packaged together to define the PDF/VT file stream. FIG. 6 shows a sample MIME package generated during the splitting process in FIG. 4. The illustrative PDF/VT stream is described by defining its fields, as follows: "multipart/mixed" is a content type field; "X-PDFVT-Stream-version" with the value 1 is a header field appearing in the stream ahead of the content type field; "application/pdf" identifies PDF files as the content type; "application/vnd.iccprofile" identifies ICC profile files as the content type; "inline" refers to encoded PDF/VT file portions that contain directly interpretable content; and, "attachment" is encoded PDF/VT file portions that contain only reusable content with the "filename" parameter. The PDF files only reference to PDF file portions or ICC profiles in the PDF/VT stream that are encoded earlier in the stream by referring to values of their filename parameters. The package parts that are designated by the "inline" field are not referenced by the PDF/VT files that are present in the stream. All the PDF/VT files in the PDF/VT stream is prepared for the same characterized printing condition.

Continuing with FIG. 4, the package is streamed to the DFE at S418. Alternatively, the print job can be spooled if it meets the necessary size limitations. The splitting pre-process ends at S420.

Figure 7:
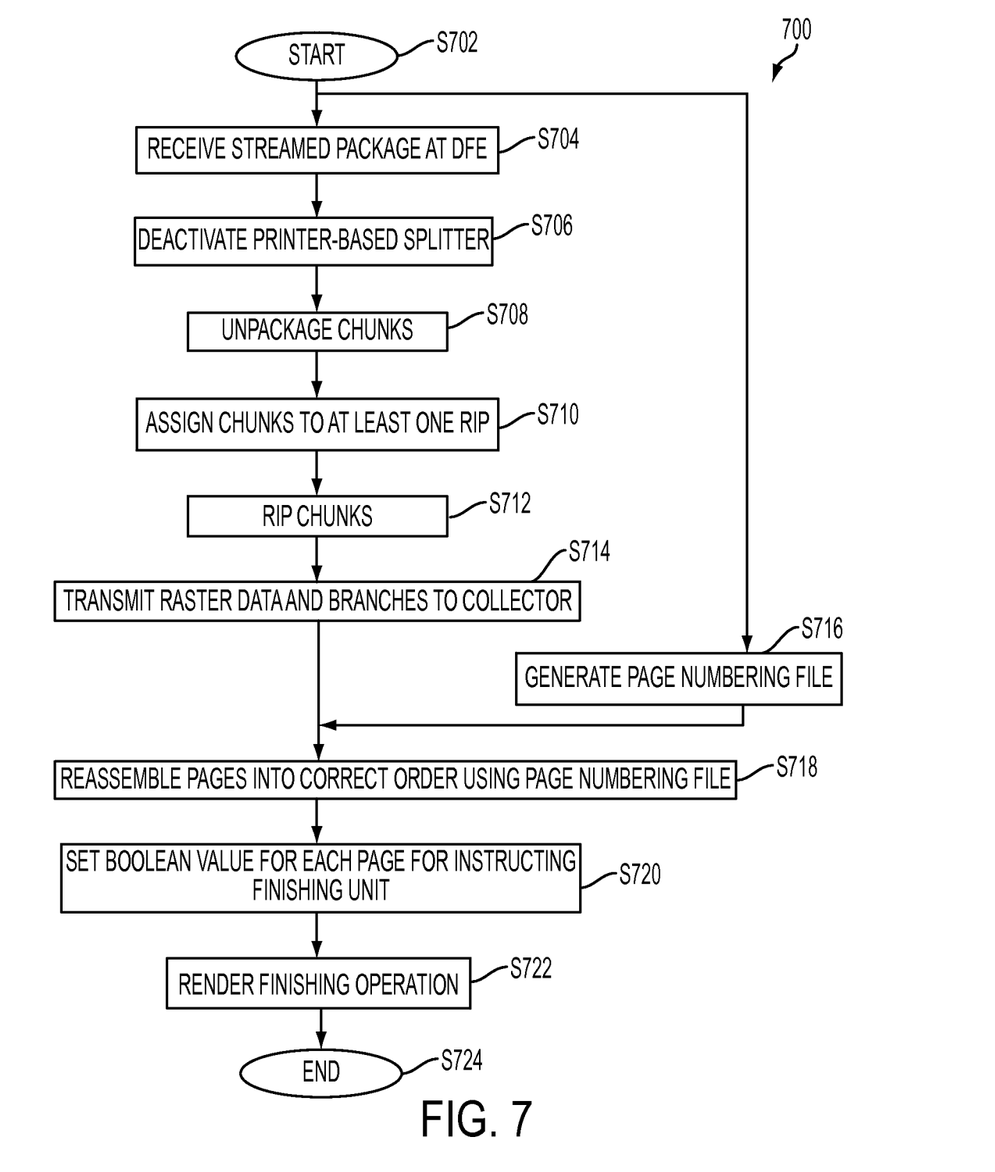
FIG. 7 is a flow chart illustrating an exemplary method 500 for rendering output at a DFE using data provided from the process in FIG. 4.

FIG. 7 is a flow chart illustrating an exemplary method 700 for rendering output at a DFE using streamed data provided from the process in FIG. 4. The method starts at S702. At the printer device, the streamed package is received at a gateway at S704, which identifies it as a product of the splitting pre-process (of FIG. 4) using its tag. In response to being identified, the printer device initiates a chunk handing process. The printer device deactivates the printer-based splitter at S706. Mainly, a splitting supervisor module and the printer-based splitter are turned off. The gateway also adds attributes to the package in the form of job commands.

The package, e.g., in the form of spooled data, is transmitted to a chunk handling module (hereinafter referred to as "the chunk handler"). The chunk handler unpackages the chunks at S708. The chunk handler transmits the unpackaged chunks to a chunk identification module ("PPR/CDF"). The job ticket is also provided to the chunk identification module.

The chunk identification module assigns each identified chunk to at least one raster image processor at S710. In the discussed embodiment, the printer device includes at least two RIPs that are capable of simultaneously RIPping. Simultaneously, the job ticket (JDF) is also provided to the raster image processors. The job ticket enables the RIP(s) to access the metadata including the begin-set indicator and page number information. As mentioned, this metadata can be embedded in the pages of the chunk or in the branch corresponding to the chunk. In another embodiment, the begin-set indicator metadata can be embedded within the pages in the chunk and the page numbers information can be embedded in the branch.

At S712, the chunks undergo raster image processing to produce raster data. After the RIPping at S712, the RIP detects the catalog branches, and transmits the raster data and the branches to the collector module at S714. In a concurrent operation, the system generates a page numbering file at S716. Mainly, the control data (referred to as "dictionary content" including the page number and begin-set indicator information), that was received at the gateway is used to generate commands for each chunk using the file generation module. The file generation generates a page numbering file describing each chunk by its pages.

This page numbering file and the raster data are sent to a collector module ("collector"). The collector reassembles the pages in the correct order at S718 using the information in the page numbering file. Mainly, the collector determines which page to supply to a buffer manager using the page numbering file. The buffer manager receives the pages in continuous order. Therefore, to provide the pages in continuous order, the collector acquires the begin-set indicator information from the dictionary output. In the contemplated embodiment, the dictionary output can be Adobe supplied adobe comment renderer ("ACR") dictionary output.

In another embodiment, instead of the page numbering file being supplied to the collector, the chunk identification module can add the page numbering content to the beginning of processing ("BOP") and end of processing ("EOP") information. This information can be used by the collector to determine which pages that it supplies to the buffer manager.

The collector determines the first page in a set using the begin-set indicator information and the corresponding field information in the package. The collector determines whether the chunk includes multiple pages within a set and/or subset from the after the begin-set indicator command. In this manner, the collector ensures that a begin-set indicator command is entered downstream for only the first page of each set.

This begin-set indicator information is used by the collector to set a Boolean value within a finishing unit dictionary for each page at S720. The Boolean value indicates where the page falls within a set, such as, whether the page is the first page in a set or the last page in a set. In one example, the Boolean value can be set to a "1" value for only the pages representing the first page in a set and to a "0" value for all other pages. The buffer reads the Boolean value within the dictionary for each page. In response to the Boolean value being true, the print device instructs the finishing unit to end the finishing operation for the set of pages including the preceding page. For example, the buffer can set the finishing unit to "end of finishing unit" ("EOFU")

for the preceding set of pages. And, the print device can instruct the finishing unit to start the finishing operation for the current page that is inserted into the finishing unit and belongs to the next set of pages. For example, the buffer can set the finishing unit to "beginning of finishing unit" ("BOFU").

The PDF/VT print job is otherwise processed in a conventional manner before and after the present splitting and streaming processes that are discussed herein. For example, the printer device renders the document using a conventional marking process at S722. The process ends at S724.

One aspect of the present disclosure is a splitting operation performed on the print job before streaming it to the printer device, and thus relieving the printer device from the processing burden. By converting the catalog tree into a number of branches, and packaging the split PDF/VT document as a chunked stream content, the printer device can process each chunk faster by having access to only the relevant portion of the catalog tree in the branch.

One aspect of inserting the set boundary information within the PDL information is that it enables the printer device to drive the correct finishing outcomes.

One aspect of inserting the page numbering information as metadata embedded into the chunks is that it enables the DFE to reassemble the pages in the correct order when the document pages are split into non-contiguous (PDL) chunks.

Another aspect of the present system is a system that is enabled to handle set boundary information contained within the PDL information. Similarly, the printer device is enabled to handle non-contiguous page numbering information based on the splitting operation performed at the client device.

A further aspect of the system is the gateway, which can inspect the PDF/VT file that is streamed from the client device. The tagged PDF/VT file can indicate whether the document was replicated.

Although the control method 2, 4, 7 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for outputting a print job, the method comprising:
   accessing at a client computer a first file representing a previously created document;
   accessing a catalog tree residing in the document and including metadata attached to each page of the document, the metadata corresponding with a job ticket embedded in the first file for advising a printer device how to apply the metadata for rendering the document;
   dividing pages in the document into multiple chunks by splitting the pages in alternating fashion at a fixed distance, wherein the dividing is performed according to a predetermined chunk size parameter using a splitter located in the client computer;
   trimming the catalog tree into portions each including only information that is required for a resident page within a chunk;
   generating a branch for each chunk, the branch containing the trimmed portions of the catalog tree corresponding to resident pages within the chunks;
   adding set boundary information at nodes of the branches, wherein each node defines a finishing level and the set boundary information is operative to be used by an associated raster image processor to generate commands for the chunk, and
   embedding the corresponding branch information into the each chunk;
   generating a second file including the chunks, wherein the second file includes page numbers corresponding to each page of the document that is included in each chunk, and at least one set-boundary indicator indicating a boundary for each set of pages that are grouped together for a finishing operation; and,
   streaming the second file as a package to a digital front end (DFE) of an output device.

2. The method of claim 1 further comprising:
   receiving predetermined parameters for performing the splitting; and,
   splitting the document according to the predetermined parameters.

3. The method of claim 1, wherein a parameter is selected from a group consisting:
   one of a minimum and maximum number of pages included in each chunk;
   one of a minimum and maximum amount of storage used by a chunk; and,
   a combination of the above.

4. The method of claim 1, wherein the first file is in Portable Document Format (PDF).

5. The method of claim 1, wherein the splitting of the pages in the finished document includes:
   interleaving the pages in the finished document to form non-contiguous chunks.

6. A system for outputting a print job, the system comprising:
   a client computer, the client computer including:
      a splitter adapted to:
         divide pages in a finished document into multiple chunks by splitting the pages in the finished document after the pages are formatted, wherein the splitting is performed in alternating fashion at a fixed distance according to a predetermined chunk size parameter;
         trim into portions a catalog tree residing in the finished document and including metadata corresponding with a job ticket embedded in the first file, each portion including the metadata for a corresponding page;
      a processor adapted to;

generate branches each including only the trimmed portions of the catalog trees corresponding to resident pages within a chunk;

add set boundary information at nodes of the branches, wherein each node defines a finishing level and the set boundary information is used by an associated raster image processor to generate commands for the chunk;

generate a package including the chunks, wherein the package includes pages numbers corresponding to each page of the document that is included in each chunk and at least one set-boundary indicator indicating a boundary for each set of pages that are grouped together for a finishing operation;

embed the corresponding branch information into the each chunk; and stream the package to a digital front end (DFE); and an output device including;

the DFE for rendering the finished document, and a preprocessor operative to deactivate a splitter located in the output device in response to identifying a streamed file as including the package.

7. The system of claim 6, wherein the output device includes a print rendering device.

8. The system of claim 6, wherein the output device includes:

a chunk handling module adapted to unpackage the chunks and assign the chunks between a series of raster image processors (RIPs).

9. The system of claim 6, wherein the output device includes at least two RIPs adapted to receive and process different chunks.

10. The system of claim 6, wherein the output device includes:

a collector module adapted to analyze page information in the second file to reassemble the pages of the document in correct order.

11. The system of claim 6, wherein the document is in Portable Document Format (PDF).

12. The system of claim 6, wherein the splitter is adapted to:

interleave the pages in the finished document to form non-contiguous chunks.

\* \* \* \* \*